US006654656B2

(12) United States Patent
Kesavadas et al.

(10) Patent No.: US 6,654,656 B2
(45) Date of Patent: Nov. 25, 2003

(54) RAPID INFORMATIONAL PROTOTYPES, INCLUDING RAPID COLORED PROTOTYPES

(75) Inventors: Thenkurussi Kesavadas, Amherst, NY (US); Kirk C. Stalis, Millport, NY (US)

(73) Assignee: The Research Foundation of State University of New York, Amherst, NY (US)

( * ) Notice: Subject to any disclaimer, the term of this patent is extended or adjusted under 35 U.S.C. 154(b) by 263 days.

(21) Appl. No.: 09/799,953

(22) Filed: Mar. 6, 2001

(65) Prior Publication Data

US 2003/0167099 A1 Sep. 4, 2003

(51) Int. Cl.[7] .............................................. G06F 19/00
(52) U.S. Cl. ........................................ 700/119; 700/120
(58) Field of Search ....................... 703/1, 6, 7; 700/97, 700/98, 118, 119, 120, 163, 183; 345/419, 420

(56) References Cited

U.S. PATENT DOCUMENTS

| | | | |
|---|---|---|---|
| 4,575,330 A | | 3/1986 | Hull .......................... 425/174.4 |
| 4,940,412 A | | 7/1990 | Blumenthal .................. 434/267 |
| 5,587,913 A | * | 12/1996 | Abrams et al. ............. 700/119 |
| 5,596,504 A | | 1/1997 | Tata et al. ............. 364/468.27 |
| 5,610,824 A | * | 3/1997 | Vinson et al. ............... 700/182 |
| 5,663,883 A | | 9/1997 | Thomas et al. ......... 364/468.26 |
| 5,705,117 A | | 1/1998 | O'Connor et al. ........... 264/401 |
| 5,768,134 A | | 6/1998 | Swaelens et al. ....... 364/468.28 |
| 5,779,833 A | | 7/1998 | Cawley et al. ............ 156/89.11 |
| 5,818,718 A | | 10/1998 | Thomas et al. ......... 364/468.26 |
| 5,965,079 A | * | 10/1999 | Manners ...................... 700/120 |

FOREIGN PATENT DOCUMENTS

EP          0 535 984 A1         4/1993

* cited by examiner

Primary Examiner—Leo Picard
Assistant Examiner—W Russell Swindell
(74) Attorney, Agent, or Firm—Simpson & Simpson, PLLC

(57) ABSTRACT

The disclosure relates to rapid informational prototypes of three-dimensional objects and systems having three or more dimensions, wherein the informational prototype includes information beyond outer physical shape, such as stress contours, thermal gradients, internal structures and elements, and elements varying with time. One preferred manner for indicating information is through the use of differently colored regions in the prototype. According to a rapid prototyping method of the present invention, a series of slices through the object or system are defined by an ordinal number, overall contour information for describing shape of the slice in an X-Y plane, slice thickness information for describing thickness of the slice in a Z direction, and slice image information for providing useful information other than the overall contour information, preferably through color images. The method further involves cutting or otherwise extracting a plurality of layers corresponding to the defined slices from stock material, such as transparent plastic, and applying corresponding slice image information to the layers either before or after they are extracted. The layers are stacked based on the ordinal numbers of the corresponding slices to form the informational prototype. A tab is preferably added to the contour information of each slice to facilitate manipulation of the individual layers as well as the completed informational prototype. A data file format is also disclosed for storing a representation of a rapid informational prototype in an information medium. The data file format generally comprises a file header for identifying the data file, a body segment for registering a plurality slice images with a plurality of slices taken through the object or system, and a plurality of slice segments for indicating an overall contour and a thickness for each of the slices.

43 Claims, 8 Drawing Sheets

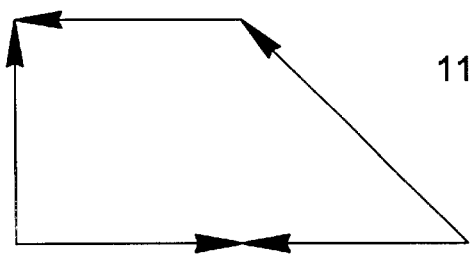
FIG. 5A
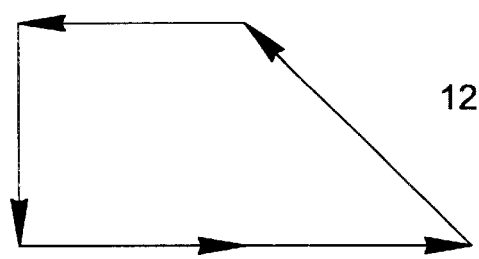
FIG. 5B
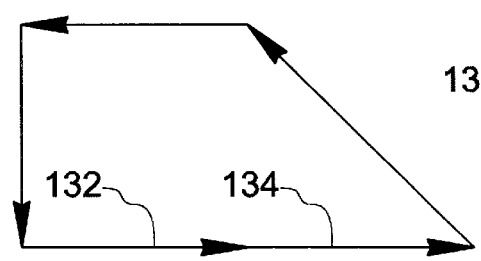
FIG. 5C
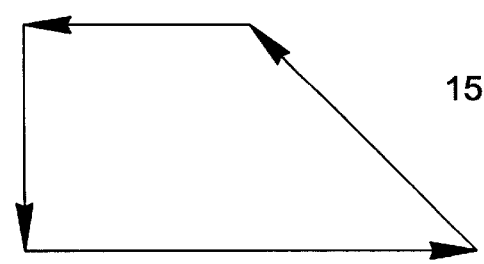
FIG. 5D
```
                    LINE SEGMENTS FROM
                    SLICING STL FILE:
           110      0,0,0    0,0,1
                    2,0,0    1,0,1
                    2,0,0    1,0,0
                    0,0,0    1,0,0
                    1,0,1    0,0,1
                    SORTED LINE SEGMENT
                    LIST
           120      0,0,1    0,0,0
                    0,0,0    1,0,0
                    1,0,0    2,0,0
                    2,0,0    1,0,1
                    1,0,1    0,0,1
                    SLOPE CHECKING
           130      0,0,1    0,0,0
                    0,0,0    1,0,0
                    1,0,0    2,0,0
                    2,0,0    1,0,1
                    1,0,1    0,0,1
           140      DELETE POINT 1,0,0
                    FINAL LINE SEGMENT
                    LIST
           150      0,0,1    0,0,0
                    0,0,0    2,0,0
                    2,0,0    1,0,1
                    1,0,1    0,0,1
```
FIG. 6

RAPID INFORMATIONAL PROTOTYPES, INCLUDING RAPID COLORED PROTOTYPES

REFERENCE TO COMPUTER PROGRAM LISTING APPENDIX

The present application includes a computer program listing appendix on compact disc. Two duplicate compact discs are provided herewith. Each compact disc contains an ASCII text file of the computer program listing as follows:

Filename: 554_999671 Computer Program Listing.txt

Size: 48,936 bytes

Date Created: Jan. 17, 2001

The computer program listing appendix is hereby expressly incorporated by reference in the present application.

BACKGROUND OF THE INVENTION

The invention generally relates to three-dimensional prototypes constructed from stacked layers, and more particularly to a method, computer file format, and configuration for making improved rapid prototypes that provide useful information pertaining to a three-dimensional object or system.

Rapid prototyping techniques have been developed for producing three-dimensional models based on stored data describing an object. U.S. Pat. No. 4,575,030 to Hull describes a technique known as stereolithography, whereby a three-dimensional prototype is built by stacking successive thin layers of a solidified curable fluid medium. In a particular embodiment, an ultra-violet light beam movable under computer control in an X-Y plane is used to cure a surface layer of a fluid bath, and a platform in the bath is then moved incrementally in a Z direction to allow curing of the next layer, and so on. It is common practice for computer-aided design (CAD) drawing files to be converted to an STL file format for stereolithography. The STL file format defines the three-dimensional external surface of an object by specifying a set of many flat planar faces known as "facets" and the outward pointing normals associated with the facets.

Another technique is described in U.S. Pat. No. 4,940,412 to Blumenthal. This patent teaches a method of manufacturing three-dimensional anatomic models by using a series of tomographic section images as masks between a light source and a liquid photosensitive polymer. The body part section and a grid for registering the body part with actual tissue are represented as transparent regions of the opaque mask.

European Patent Publication No. 0 535 984 A1 discloses a rapid prototyping method designed to improve on the essentially homogeneous color and texture exhibited by prototypes formed by the previously mentioned techniques. In one embodiment, a photocolorable agent is added to the photohardenable liquid composition that is not activated by the curing radiation wavelength. After each layer is formed by irradiating the liquid, a color differing from that of the hardened layer is incorporated at chosen regions of the layer by selectively exposing the chosen regions to radiation which does activate the photocolorable agent. In another embodiment, a dye is deposited on chosen regions of each layer to achieve color difference. In yet another embodiment, a photoresponsive agent capable of altering tactile characteristics by controlling the degree of crosslinking in the polymer is added to the photohardenable liquid composition for selective activation by irradiation.

U.S. Pat. No. 5,596,504 to Tata et al. is concerned generally with algorithms for improved processing of an input STL model data file in an automated stereolithography system.

An inexpensive alternative to stereolithography is described in U.S. Pat. No. 5,663,883 to Thomas et al. According to this method, a three-dimensional object represented by an STL file is electronically decomposed into a plurality of thick layers, which are then electronically sliced into cross-sectional slices the thickness of a sheet of construction material. The slices are cut from sheets of construction material in a pattern which permits simultaneous construction of several thick layers by stacking a plurality of sheets. The thick layers are then assembled to form the completed prototype.

U.S. Pat. No. 5,705,117 to O'Connor et al. relates to a method of combining inserts of a non-photopolymer material into a rapid prototype produced by stereolithography to provide a functioning prototype. According to the method, an STL file is modified to include cavities for the inserts, and is then divided into a series of subpart STL files used to develop individual sections of the part. The individual sections of the part are separated at locations where the inserts are to be positioned. The photo-curing process is paused to allow a non-photopolymer insert to be manually positioned on one section of the developing part each time a section is formed. The subpart STL files provide various alignment structures to align the individual sections relative to the support platform.

A method for making a medical model of a body part based on digital image information, such as that provided by a computer tomography scanner, is disclosed in U.S. Pat. No. 5,768,134 to Swaelens et al. The method is characterized by the incorporation of additional digital information corresponding to a functional element into the digital image information describing the body part, whereby the functional element is realized in the produced model. For example, the method can be used for the preparation of tooth implants, wherein the model serves as a template for the implant and the functional element is an opening or notch at the location where drilling is required.

U.S. Pat. No. 5,779,833 to Cawley et al. discloses a rapid prototyping technique involving contoured layers cut from sheets of material. The layers, which represent cross-sections of a three-dimensional object, are stacked, laminated, and secured to each other to form the object. Ceramic material sheets can be used, along with a second type of sheet made of a fugitive material, such as an organic material that burns out during firing or green tape made from inorganic powder that is converted to a loose powder during firing. The fugitive material is cut into layers representing voids in the object and stacked with the ceramic layers, thereby allowing complex geometries to be achieved.

Finally, U.S. Pat. No. 5,818,718 to Thomas et al. is directed to a rapid prototype modeling system that includes software for electronically decomposing a discrete part represented by an STL file into electronic layers using a paradigm characterized by a higher than zero order fit with respect to the surface of the part.

BRIEF SUMMARY OF THE INVENTION

Therefore, it is an object of the present invention to provide an inexpensive rapid informational prototype of an object or system that represents information describing aspects of the object or system apart from merely its shape.

It is another object of the present invention to provide a rapid informational prototype in the form of a rapid colored prototype wherein information is represented by differently colored regions of the prototype.

It is a further object of the present invention to provide a rapid informational prototype that has added tabs for easier assembly and manipulation of the prototype.

It is a further object of the present invention to provide a method for making a rapid informational prototype as mentioned above in a straightforward manner.

It is a further object of the present invention to provide a computer data file format for electronically representing a rapid informational prototype formed in accordance with the present invention.

It is a further object of the present invention to provide a computer data file format for a rapid informational prototype that is supplemental to the existing STL file format.

The present invention generally involves a method of manufacturing an informational prototype of a three-dimensional object or a system having three or more dimensions. Pursuant to the method of the present invention, a series of slices through the object or system are defined by an ordinal number, overall contour information for describing shape of the slice in an X-Y plane, slice thickness information for describing thickness of the slice in a Z direction, and slice image information for providing useful information other than the overall contour information, preferably through color images. Useful information might include, for sake of example, thermal gradients, stress contours, internal elements or time dependent changes. The method further involves cutting or otherwise extracting a plurality of layers corresponding to the defined slices from stock material, such as transparent plastic, and applying corresponding slice image information to the layers. The image information can be applied to the layers either before or after they are extracted from surrounding stock material. Finally, the layers are stacked based on the ordinal numbers of the corresponding slices to form the informational prototype. In a preferred method, a tab is added to the contour information of each slice to facilitate manipulation of the individual layers as well as the completed informational prototype.

A data file format according to the present invention for storing a representation of a rapid informational prototype in an information medium generally comprises a file header for identifying the data file, a body segment for registering a plurality slice images with a plurality of slices taken through the object or system, and a plurality of slice segments for indicating an overall contour and a thickness for each of the slices. In accordance with the invention, each of the slice images indicates information other than the overall contour of the slice registered therewith.

Informational prototypes formed in accordance with the present invention are relatively inexpensive to produce and are helpful in visualizing aspects of the object or system prototyped beyond external shape.

BRIEF DESCRIPTION OF THE SEVERAL VIEWS OF THE DRAWING

The nature and mode of operation of the present invention will now be more fully described in the following detailed description of the preferred embodiments taken with the accompanying drawing figures, in which:

FIGS. 5A–5D are schematic representations showing steps in a process of contour extraction based on line segments generated from slicing an object represented in STL file format;

FIG. 6 is a flow diagram containing line segment data corresponding to the schematic representations of FIGS. 5A–5D;

DETAILED DESCRIPTION OF THE INVENTION

GENERAL SET-UP

Figure 1:
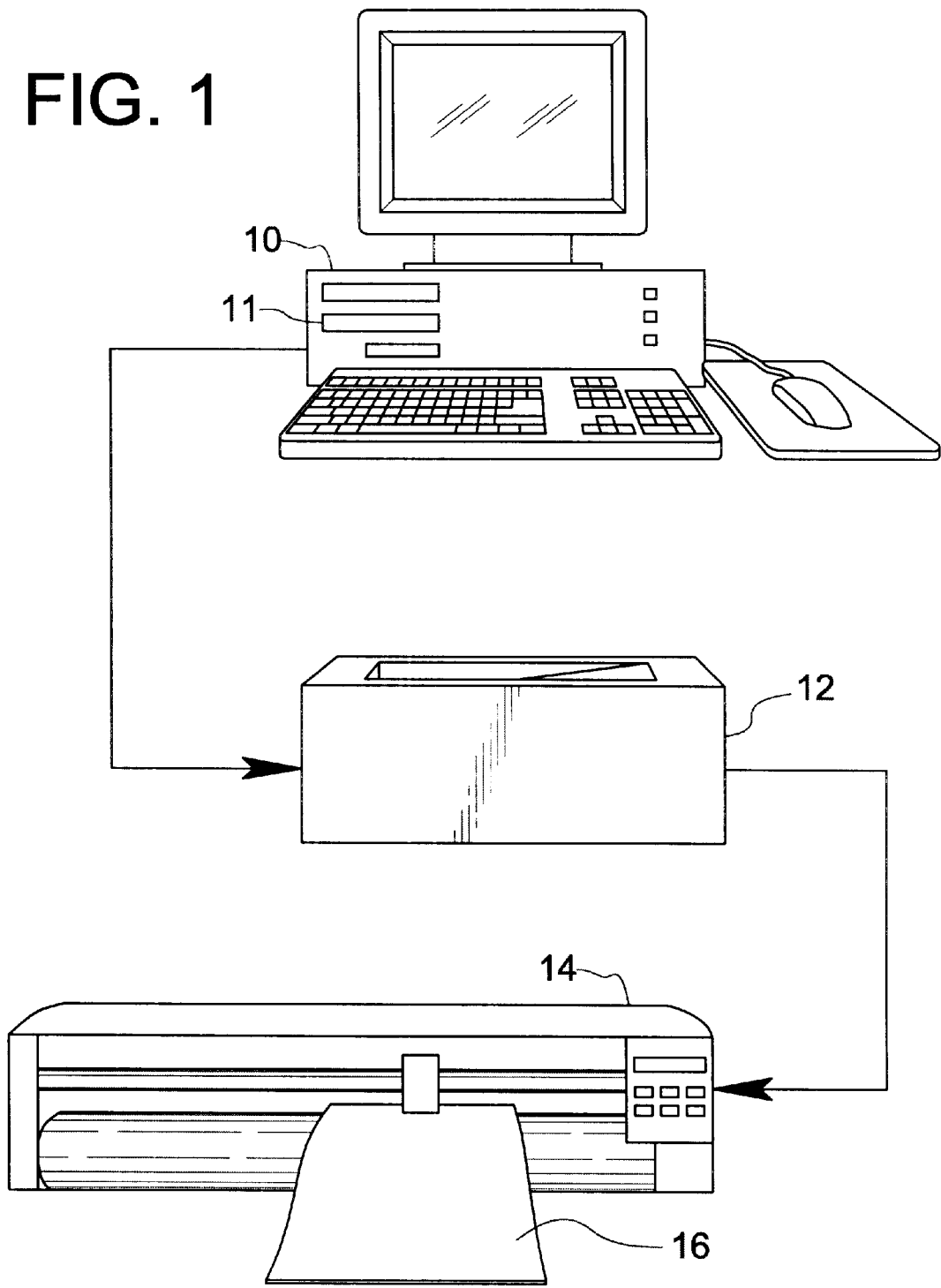
FIG. 1 is a schematic diagram illustrating a system for creating rapid informational prototypes in accordance with the present invention.

A preferred method for making an improved rapid prototype according to the present invention involves defining a plurality of slices through a three-dimensional object or system, applying slice image information associated with each defined slice to a respective area on a sheet of stock material, extracting a plurality of layers corresponding to the defined slices from the sheet or sheets of stock material, and stacking the layers to form the prototype. Referring to FIG. 1, the method of the present invention is implemented using a JP5 rapid prototyping system developed by Schroff Development Corporation. The system comprises a personal computer 10 connected to an output unit 12 and a cutting unit 14, whereby slice definitions and slice image information stored in a memory device 11 of personal computer 10 are communicated to the output unit 12 and cutting unit 14. Output unit 12 applies the slice image information to stock material 16, and then cutting unit 14 extracts the plurality of layers from the stock material by cutting the stock material so the layers can be stacked. Output unit 12 can be a printer, plotter, or other means for applying stored image information to a sheet of stock material. By way of example, output unit 12 could function by exposing stock material 16 to radiation or by fused deposition processing. Cutting unit 14 can be a computer-controlled vinyl sign cutter that operates similar to a plotter but includes a rotating carbide drag knife instead of a pen. However, other types of cutting units are possible, including computer controlled cutting units wherein the sheet of stock material is located on an X-Y platform that is moved in the X-Y plane by an X-axis driver and a Y-axis driver relative to a stationary cutting means, such as a wire, blade, or laser cutter, that is suitable for the particular stock material. Also by way of example, stock material 16 can be opaque, translucent, or transparent. Where visibility of internal images is important, it is preferred to use a transparent stock material, including but not limited to an optical grade plastic material.

It is emphasized that the steps of applying the image information to the stock material and extracting the layers from the stock material may take place in either order. That is, the image information can be applied to sheets of stock material before the sheets are cut by cutting unit 14 into stackable layers, or the image information can be applied to stackable layers already cut from the stock material.

SOFTWARE

The JP5 rapid prototyping system operates by importing an STL file into the JP5 software, which electronically divides the model into a plurality of slices. In the present embodiment, the JP5 system utilizes SILVERSCREEN® solid modeling software for manipulating and slicing the model. SILVERSCREEN® solid modeling software contains a resident C compiler known as SilverC that was developed to be compliant with the more popular versions of ANSI C which are offered by Microsoft and Borland. The main difference between C and SilverC is that C uses a machine language and SilverC uses a virtual machine language called postfix code. Postfix code requires another program to be present to interpret and execute the program instructions. In this case, SILVERSCREEN® software must be present to interpret the program instructions from SilverC. The use of SilverC and the postfix code has a major advantage and a disadvantage when compared to ANSI C. The major advantage of using SilverC is that the program is able to take advantage of libraries and operations that are native to SILVERSCREEN® software. This advantage allows the complexity of the program to be reduced. The disadvantage of using SilverC is that the execution speed of instructions is decreased because the SILVERSCREEN® software must translate each instruction from the program.

Figure 2:
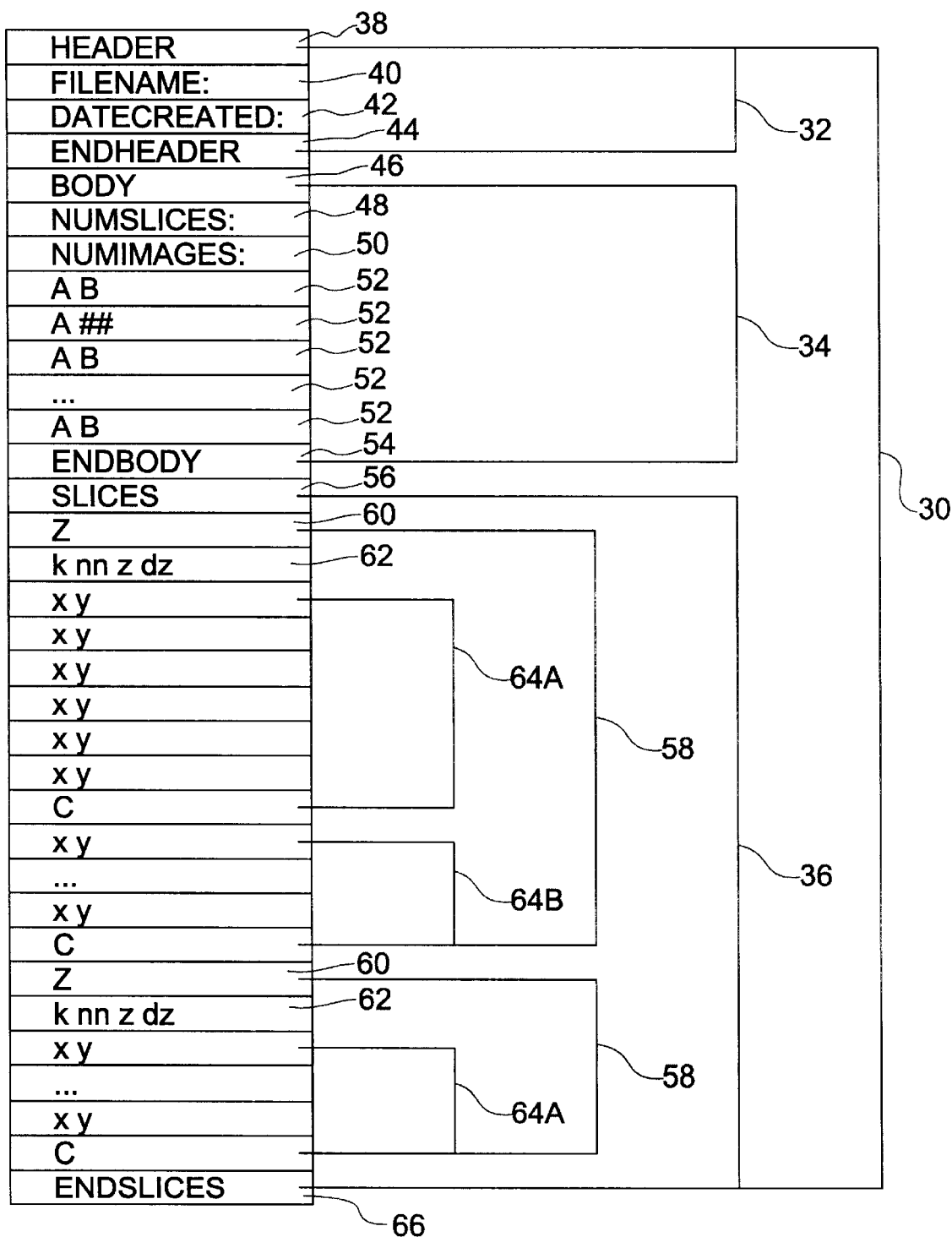
FIG. 2 is a schematic diagram showing a computer file format for storing information for building a rapid informational prototype in accordance with a preferred embodiment of the present invention.

In accordance with currently preferred implementation of the present invention, slice definitions are stored in a single data file, and the slice image information for the various defined slices is stored in a series of image files referenced by the data file. FIG. 2 schematically shows a preferred format of a data file 30 according to the present invention. Data file 30 generally comprises a header portion 32, a body portion 34, and a slices portion 36.

Header portion 32 is reserved for general identification information, such as a file name and a date the file was created. Header portion 32 could be configured to store additional types of identifying information such as a project reference number, author's name, or the like. In the preferred embodiment shown in FIG. 2, header 32 includes a first block 38 containing a keyword "Header" signifying the beginning of the header portion, a second block 40 for storing a file name, a third block 42 for storing a creation date of the data file 30, and a fourth block 44 containing a keyword "Endheader" signifying the end of the header portion.

Body portion 34 is provided for storing reference information linking outside image files to associated slices. A keyword "Body" stored in block 46 indicates the beginning of the body portion. The next two blocks 48 and 50 contain integer data indicating the number of total slices and the total number of referenced image files. Since not every slice is required to have an associated image, it follows that the total number of referenced image files must be less than or equal to the total number of slices. After block 50, there is a series of blocks 52 each containing a slice ordinal number A and a file path string B for locating an image file associated with that slice. Where there is no image file associated with the slice, a null string "##" follows the slice ordinal number A. The number of blocks 52 is equal to the total number of slices provided in block 48. Finally, a keyword "Endbody" stored in block 54 denotes the end of body portion 34.

Slices portion 36 stores point coordinates describing the contour or contours of each slice. The beginning of slices portion 36 is signaled by a keyword "Slices" in block 56. Each new electronic slice 58 is denoted by a keyword "Z" as found in blocks 60. The keyword "Z" is followed by a block 62 containing data about the slice that are separated by spaces. The value k is the slice ordinal number, an integer. The value nn is the total number of points in the contour or contours describing an outer or peripheral boundary shape and any internal boundary shapes of the slice, and serves as an upper limit on reading contour points from data file 30. The value z is an absolute Z-axis coordinate of the slice, and the value dz is the z-axis thickness of the slice. Block 62 is followed by a peripheral contour definition 64A comprising a series of X-Y coordinate points and terminating with the keyword "C". Further contour definitions 64B for internal boundaries, such as for holes, slots, etc., can follow peripheral contour definition 64A, with each contour definition having a series of X-Y coordinate points and ending with the keyword "C". Once the last contour for a given slice has been defined, the next electronic slice 58 is defined as described above. The end of slices portion 36 is signaled by the keyword "ENDSLICES" in block 66.

Figure 3:
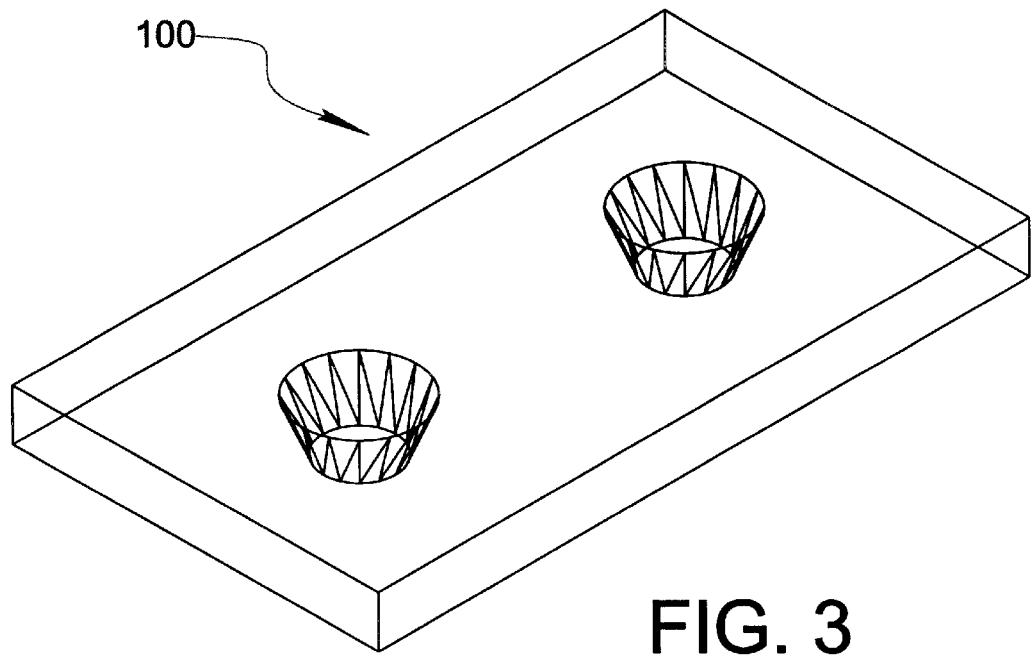
FIG. 3 is an isometric wire frame depiction of a mounting plate used as an example object for describing the present invention.
Figure 4:
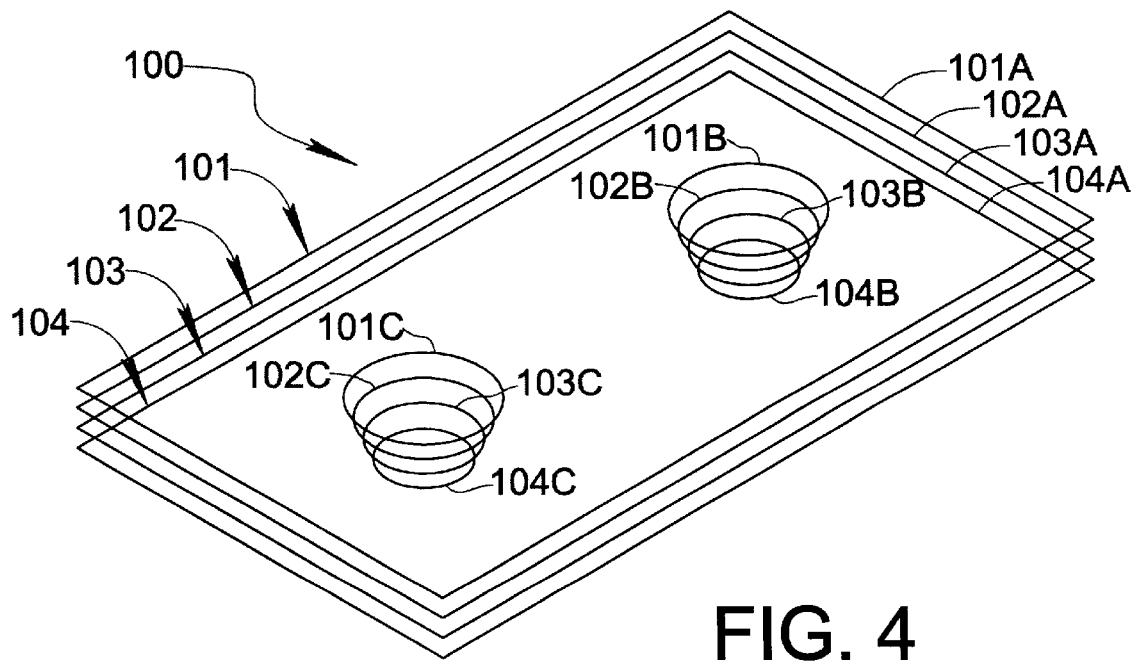
FIG. 4 is an isometric view showing a plurality of layers, each having internal and external contours, for building a prototype of the mounting plate shown in FIG. 3.

FIGS. 3 and 4 show a simple example of a mounting plate 100 represented as a wire frame object in FIG. 3 and as a plurality of slices 101, 102, 103, and 104 in FIG. 4. Slice 101 includes three contours 101A, 101B, and 101C. Contour 101A describes the rectangular periphery of the slice; contour 101B describes a first circular hole through the slice; and contour 101C describes a second circular hole through the slice. Likewise, slices 102–104 each include three contours denoted by reference suffix letter A, B, and C. An abbreviated example of a file for the mounting plate in accordance with the file structure shown in FIG. 2 is presented below:

Header
Filename: Mounting_Plate
DateCreated: 1/18/99
Endheader
Body
Numslices: 4
Numimages: 2
1 ##
2 plate2.jpg
3 plate3.jpg
4 ##
Endbody
Slices
Z
1 57 7.532 0.05
. . .
3.844, −2.125
C
3.83447, −2.07707
. . .
3.76668, −0.740716

C
3.80707, −0.713728
. . .
3.76639, −0.740773
Z
2 57 7.582 0.05
4.71875, −2.75
3.72813, −0.798385
Endslices In accordance with the present invention, custom software was developed to aid in the creation of a rapid informational prototype, a lisiting of which is provided in the computer program listing appendix referred to above. The software was developed to perform eight basic tasks. The first four tasks take advantage of the postfix code by referencing functions of the SILVERSCREEN® software. Tasks five through eight rely on customized code written to achieve the desired functions. The eight tasks are described below.

1) Importing an STL file. The STL file is an industry standard for rapid prototyping technologies, and most solid modeling software packages are capable of creating an STL file. The importation of the STL format is required in order for the software to communicate with other software that is used in the present rapid prototyping process. The software is able to import either an ASCII or a binary STL file.

2) Verifying if the STL is valid. The verification feature checks for missing facets and improperly connected triangles which can lead to invalid solid models. Verifying if the STL file contains a valid solid is necessary, because it will prevent errors in obtaining the slice contours. If a solid fails the validity check the program will not allow slicing or any other model operations to be performed.

3) Rotating and scaling the solid model. The ability to manipulate the solid is needed in order to properly orient the model. This will help minimize build time and help reduce the number of layers that have to be cut. It is possible to rotate the object along any axis at a number of specified degrees. It is also possible to increase or decrease the size of the model by any factor.

4) Slicing the solid model. Slicing the solid model is required to obtain the cross sections of the part. Basically, the process of slicing is to intersect a horizontal plane with the solid model. Each intersection point becomes a contour point. The software makes it possible to fully slice the model or to perform only a partial slicing. The program also accommodates using sheets of different thickness to build the part.

5) Extracting the contour points of the slices. The program is capable of extracting the contour points of each slice, as illustrated by example in FIGS. 5A–5D and FIG. 6. The contour points are obtained by collecting the line segments that resulted from the slicing of the STL file. In the example shown, five line segments are indicated graphically in FIG. 5A and in list form in box 110 of FIG. 6. The coordinates of the line segments listed in box 110 are then arranged in a sequential order. This step is depicted graphically in FIG. 5B, and the actual sorted list is given in box 120 of FIG. 6. After the sorted list of line segment coordinates has been established, the slopes of the line segments are checked to see if the endpoints lie on a corner of a contour, as indicated in box 130 of FIG. 6. If the endpoints are not on a corner (that is, if the slopes of successive line segments are the same), the adjacent connecting endpoints are deleted from the list. FIG. 5C shows two successive line segments 132 and 134 having the same slope which can be joined into one line segment by deleting point 1,0,0 pursuant to box 140 of FIG. 6. In this way, a plurality of successive line segments having the same slope can be replaced by a single line segment defined by two endpoints, as depicted in FIG. 5D. The remaining list given in box 150 of FIG. 6 contains a series of points that form a closed polygon, and is used for creating the rapid informational prototype file, adding tabs, and printing the slices.

Figure 7:
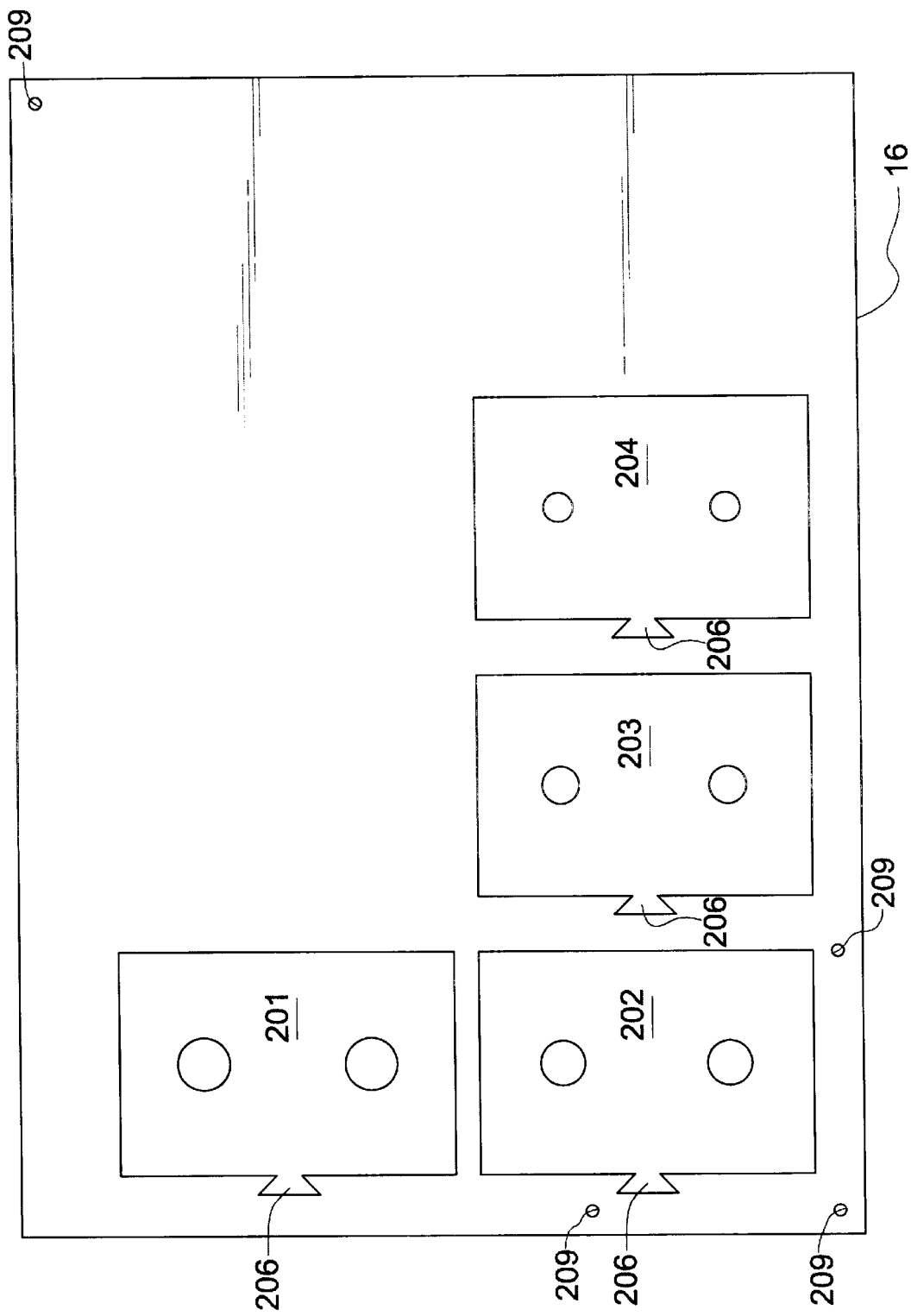
FIG. 7 is a plan view of a printed sheet from which a plurality of prototype layers is extracted.

6) Adding tabs to the slices. The program is able to add tabs to the slice contours to aid in assembling and viewing the model. The program prompts the user for the information that defines the tabs, such as the position, height and width of the tabs. The program adds the tabs to the outermost contours of each slice. FIG. 7 illustrates a sheet of stock material 16 having a plurality of prototype layers 201, 202, 203, and 204 of mounting plate 100 outlined thereon, including added tabs 206. The outlines will be followed by cutting means of cutting unit 14 to extract layers from the stock material. Tabs 206 allow the individual layers and assembled informational prototype to be more easily manipulated, and allow someone to handle the prototype without covering up visible information presented by the prototype.

7) Cutting the layers. The cutting of the layers is the main function of the program. It measures the size of the layers and arranges multiple layers on a single sheet of stock material. For example, referring to FIG. 7, a single sheet layout consists of the contours of layers 201, 202, 203, and 204 corresponding to electronic slices 101, 102, 103, and 104, respectively, as well as four aligning holes 209 to aid in assembling and mapping the images to the prototype layers. The software communicates with the sign cutter to cut the layers a single sheet at a time.

8) Exporting a Rapid Informational Prototype File. The program is able to export a rapid informational prototype file to another program or device. This is important because it allows an image to be associated with a particular slice, such that the image can be printed by output unit 12 or otherwise applied to the proper layer of stock material. The rapid informational prototype file format, as described above in connection with FIG. 2, makes it possible for other programs and output devices to register and interpret rapid informational prototype files.

EXAMPLE 1

COOLING FIN WITH THERMAL GRADIENTS

Figure 8:
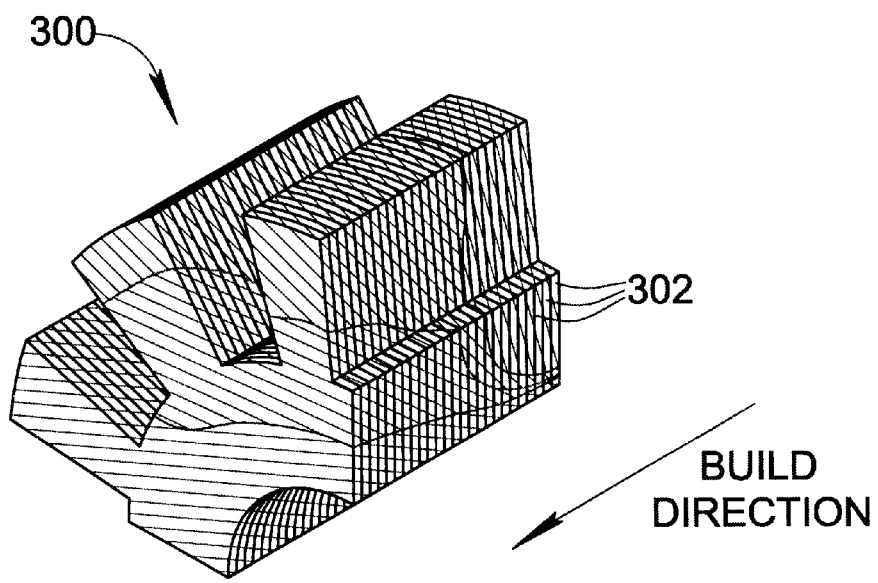
FIG. 8 is an isometric view showing a rapid informational prototype of a cooling fin formed in accordance with the present invention.
Figure 10:
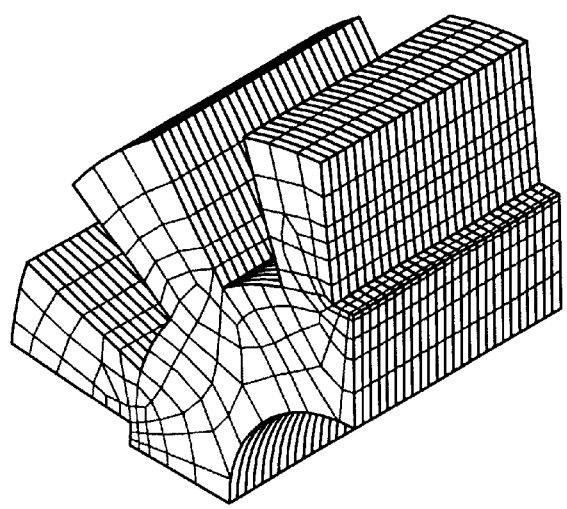
FIG. 10 is an isometric view of the cooling fin prototype of FIG. 8, however showing a thermal finite element mesh used to create the informational prototype of FIG. 9.
Figure 9:
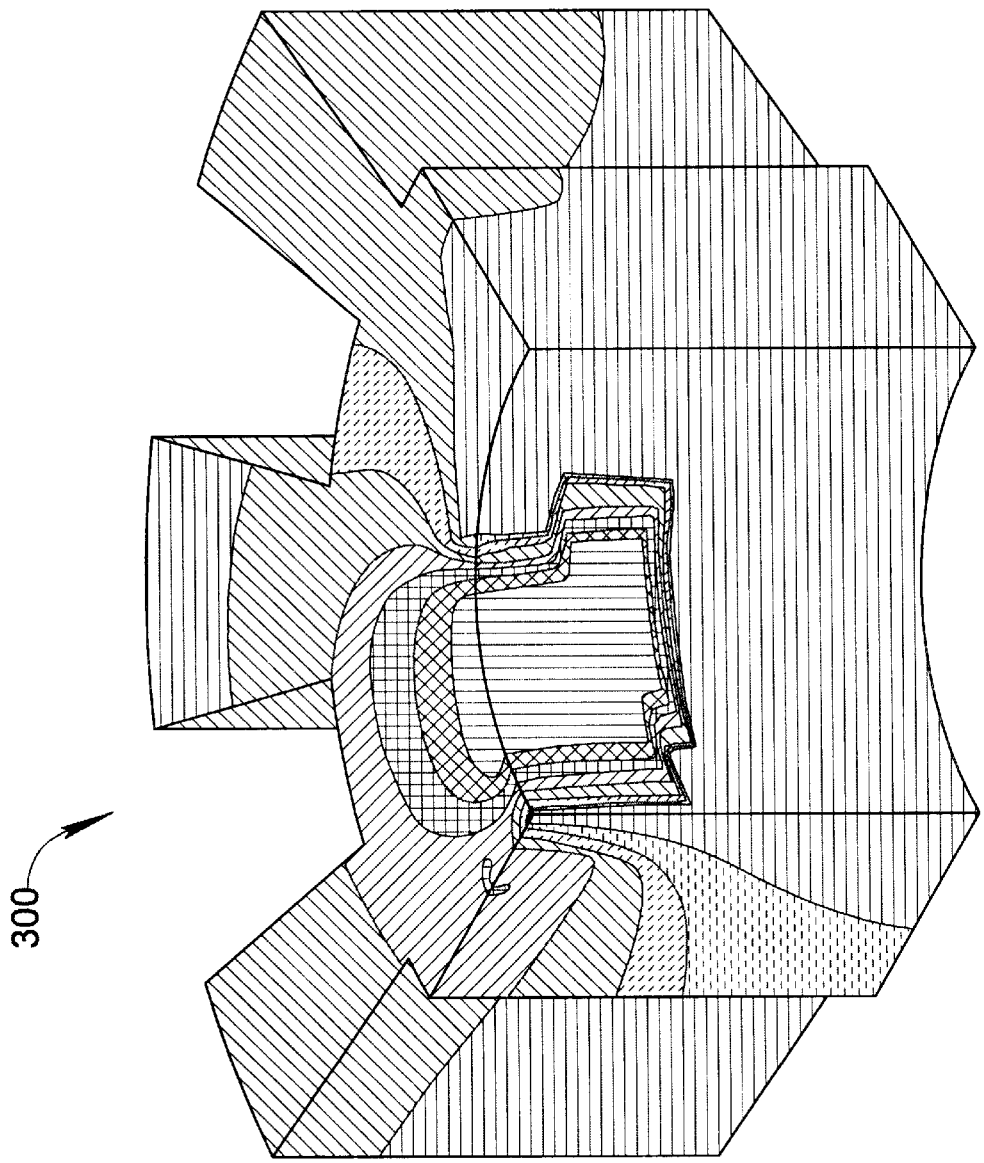
FIG. 9 is an enlarged isometric view of the cooling fin prototype of FIG. 8, however the layers are indicated as being colored to show thermal gradients.

Attention is now directed to FIGS. 8–10. FIG. 8 shows a rapid informational prototype 300 of a section of a cooling fin with static thermal gradients present. The drawing uses line hatchings to indicate color differences between regions of the three-dimensional prototype. As can be seen in FIG. 8, prototype 300 comprises a plurality of individual layers 302 that are stacked to form the informational prototype. FIG. 9, shows the cooling fin informational prototype 300 from another angle and enlarged, however the individual layers of the prototype are not shown in FIG. 9. The color image information (indicated by line hatchings) represents the thermal gradients of the cooling fin section.

The process of building the selected test case is an example of a typical process that would be implemented if a better understanding of a thermal system was desired. The process that was used to create informational prototype 300 consisted of the following steps.

A. The part orientation and the selected function of the informational prototype of the cooling fin were selected. The part orientation is along the axis that has the constant cross section. The selected function of the informational prototype is to highlight the thermal contours at five stages along the cooling fin section. The stages are located at five equally spaced locations along the build direction. In order to save stock material, the build direction of the informational prototype was scaled down by a factor of two. See FIG. 8 for an indication of the build direction.

B. A solid model file of the cooling fin was created using PRO/ENGINEER® CAD software.

C. An STL file and an IGES file were exported. The IGES file was created to aid in acquiring color information indicating the thermal gradient contours.

D. The IGES file was imported into ANSYSS engineering software, which is software that is capable of performing finite element analysis.

E. Analysis of the cooling fin was performed to evaluate the system response to the environment. Isometric views of the obtained thermal gradients of the cooling fin section are shown in FIGS. 8 and 9.

F. The thermal gradients of the selected slices were obtained. In order to obtain images that correspond to the slices, a mapped mesh was utilized. An example of a properly mapped mesh is shown in FIG. 10. The build direction of the informational prototype should correspond to the direction of the mapped mesh.

G. The STL file was imported into the custom built software.

H. The solid model was sliced and tabs were added to the contours.

I. The images of the thermal gradients were mapped to the slices using photo manipulation software called Picture Publisher 6.0.

J. The slice images were printed on ink jet transparencies and layers were cut on the JP5 sign cutter.

K. The layers were stacked in proper order according to the build direction.

EXAMPLE 2

TIME DEPENDENT SYSTEM

Figure 11:
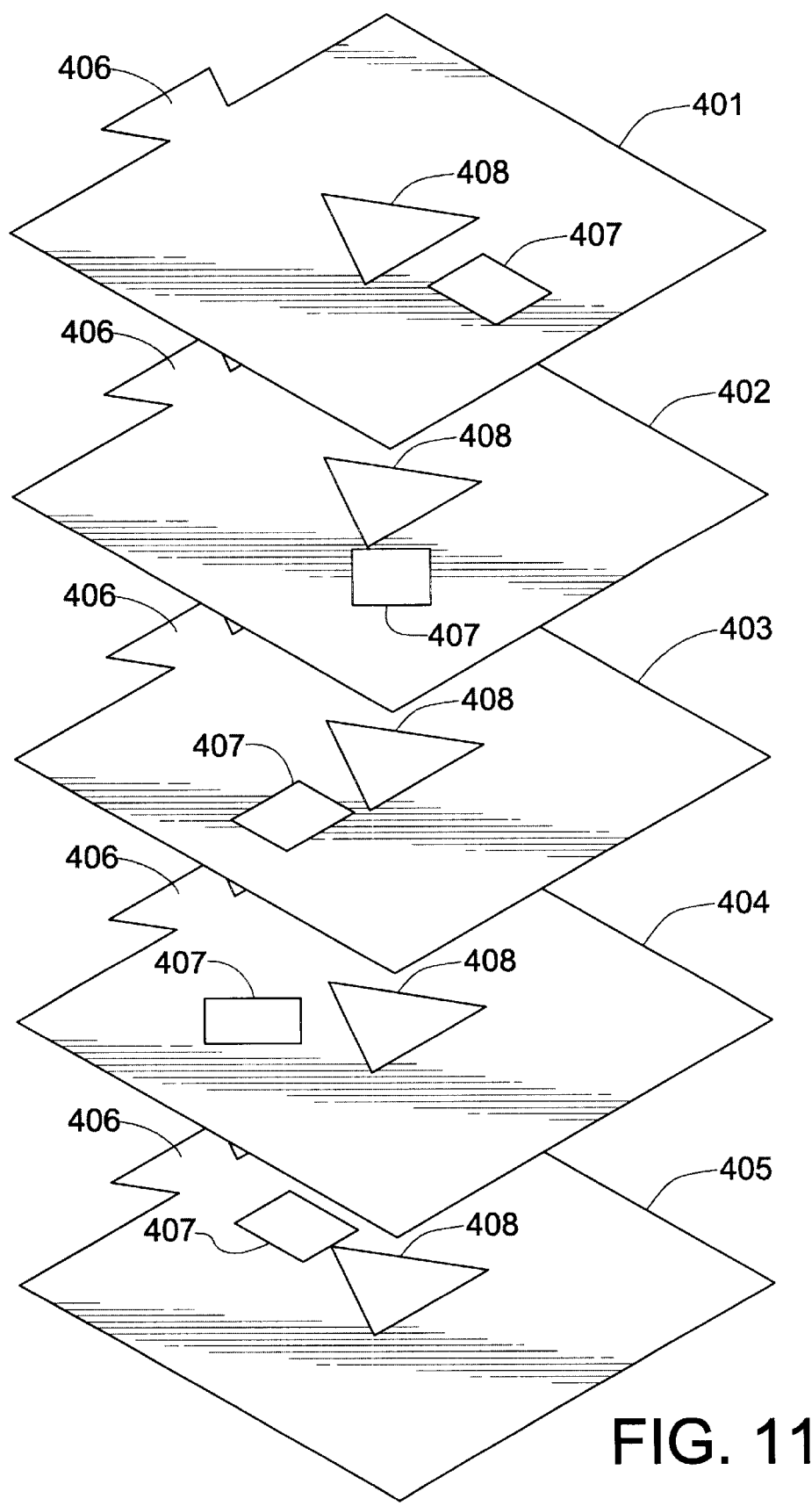
FIG. 11 shows a series of layers for constructing a rapid informational prototype of a time dependent system.

The second example of an informational prototype is the representation of a time dependent system. FIG. 11 shows a series of layers 401, 402, 403, 404, and 405 for making the prototype, each having a tab 406. The system demonstrates a particle 407 revolving around another particle 408. The selected example can also be used to represent a three-part assembly or medical images similar to an MRI. The completed informational prototype of the time dependent system models the path of a revolving particle with respect to time. Listed below are the steps that were taken to construct the prototype.

A. The part orientation and the function of the colored prototype were first selected. The part orientation would be along the axis that had the constant cross section. The selected function of the informational prototype is to represent a time dependent system.

B. A solid model file of the system was created using PRO/ENGINEER® CAD software.

C. An STL file was exported.

D. The STL file was imported into the custom built software.

E. The solid model was sliced and tabs were added to the contours.

F. The images of the slices were imported into a photo manipulation software called Picture Publisher 6.0.

G. The desired colors and text were added to the contours.

H. The colored contours were printed on ink jet transparencies.

I. The exterior or outermost contours were extracted using the custom built software.

J. The colored layers from the printer were mapped to the sign cutter and cut.

K. The layers were assembled.

What is claimed is:

1. A method of manufacturing an informational prototype of a three-dimensional object comprising the steps of:
   (A) defining a plurality of slices through said object, each of said slices being defined by an ordinal number, overall contour information for describing shape of said slice in an X-Y plane, slice thickness information for describing thickness of said slice in a Z direction, and slice image information;
   (B) extracting a plurality of layers from stock material, each of said plurality of layers corresponding to a respective one of said plurality of slices;
   (C) applying corresponding slice image information to said plurality of layers; and
   (D) stacking said plurality of layers based on said ordinal numbers of said plurality of slices to form said informational prototype.

2. The method according claim 1, wherein tab contour information is added to said overall contour information for each of said plurality of slices, whereby each of said plurality of layers includes a tab.

3. The method according to claim 2, comprising the further step of fastening said tabs together.

4. The method according to claim 3, wherein said tabs are fastened together by adhesive.

5. The method according to claim 3, wherein said tabs are fastened together by a mechanical fastener.

6. The method according to claim 1, wherein said slice image information is applied to said stock material by exposing said stock material to radiation.

7. The method according to claim 1, wherein said slice image information is applied to said stock material by fused deposition of colored material.

8. The method according to claim 1, wherein said slice image information is applied to said stock material by printing.

9. A method of manufacturing an informational prototype of a system having at least three dimensions comprising the steps of:
   (A) defining a plurality of slices taken along a Z dimension of said system, each of said slices being defined by an ordinal number, overall contour information for describing shape of said slice in an X-Y dimensional plane, slice thickness information for describing thickness of said slice in said Z dimension, and slice image information;
   (B) extracting a plurality of layers from stock material, each of said plurality of layers corresponding to a respective one of said plurality of slices;

(C) applying corresponding slice image information to said plurality of layers; and (D) stacking said plurality of layers based on said ordinal numbers of said plurality of slices to form said informational prototype.

10. The method according claim 9, wherein tab contour information is added to said overall contour information for each of said plurality of slices, whereby each of said plurality of layers includes a tab.

11. The method according to claim 10, comprising the further step of fastening said tabs together.

12. The method according to claim 11, wherein said tabs are fastened together by adhesive.

13. The method according to claim 11, wherein said tabs are fastened together by a mechanical fastener.

14. The method according to claim 9, wherein said slice image information is applied to said stock material by exposing said stock material to radiation.

15. The method according to claim 9, wherein said slice image information is applied to said stock material by fused deposition of colored material.

16. The method according to claim 9, wherein said slice image information is applied to said stock material by printing.

17. An information medium having a data file representative of an informational prototype of a three-dimensional object, said data file comprising:
   a file header for identifying said data file;
   a body segment for registering a plurality slice images with a plurality of slices taken through said object; and
   a plurality of slice segments for indicating an overall contour and a thickness for each of said plurality of slices;
   wherein each of said plurality of slice images indicates slice image information.

18. The information medium according to claim 17, wherein said plurality of slice images represents physical objects in said three-dimensional object.

19. The information medium according to claim 17, wherein said plurality of slice images represents a physical characteristic of said three-dimensional object.

20. The information medium according to claim 19, wherein said physical characteristic is a thermal gradient.

21. The information medium according to claim 19, wherein said physical characteristic is a stress contour.

22. An information medium having a data file representative of an informational prototype of a system having at least three-dimensions, said data file comprising:
   a file header for identifying said data file;
   a body segment for registering a plurality slice images with a plurality of slices taken along a Z-dimension of said system; and
   a plurality of slice segments for indicating an overall contour and a thickness for each of said plurality of slices;
   wherein each of said plurality of slice images indicates slice image information.

23. The information medium according to claim 22, wherein said Z-dimension is time.

24. An informational prototype of a three-dimensional object comprising:
   a plurality of stacked layers corresponding to a plurality slices taken through said object, each of said plurality of layers having an overall contour and a thickness; and
   a plurality of slice images applied to said plurality of layers, each of said plurality of slice images providing slice image information.

25. The informational prototype according to claim 24, wherein each of said plurality of layers includes a tab as part of said overall contour of said layer, and said tabs are fastened together.

26. The informational prototype according to claim 24, wherein said stacked layers are formed from a transparent stock material.

27. The informational prototype according to claim 24, wherein said plurality of slice images includes color images.

28. The informational prototype according to claim 24, wherein said plurality of slice images represent gradients of a physical property of said object.

29. The informational prototype according to claim 28, wherein said physical property is temperature.

30. The informational prototype according to claim 28, wherein said physical property is stress.

31. An informational prototype of a system having at least three-dimensions comprising:
   a plurality of stacked layers corresponding to a plurality slices taken along a Z-dimension of said system, each of said plurality of layers having an overall contour and a thickness; and
   a plurality of slice images applied to said plurality of layers, each of said plurality of slice images providing slice image information.

32. The informational prototype according to claim 31, wherein each of said plurality of layers includes a tab as part of said overall contour of said layer, and said tabs are fastened together.

33. The informational prototype according to claim 31, wherein said stacked layers are formed from a transparent stock material.

34. The informational prototype according to claim 31, wherein said plurality of slice images includes color images.

35. The informational prototype according to claim 31, wherein each of said plurality of slice images corresponds to a unique moment in time.

36. A prototype formed by the method of claim 1, said method comprising the steps of:
   (A) defining a plurality of slices through said object, each of said slices being defined by an ordinal number, overall contour information for describing shape of said slice in an X-Y plane, slice thickness information for describing thickness of said slice in a Z direction, and slice image information;
   (B) extracting a plurality of layers from stock material, each of said plurality of layers corresponding to a respective one of said plurality of slices;
   (C) applying corresponding slice image information to said plurality of layers; and
   (D) stacking said plurality of layers based on said ordinal numbers of said plurality of slices to form said informational prototype.

37. A prototype formed by the method of claim 9, said method comprising the steps of:
   (A) defining a plurality of slices taken along a Z dimension of said system each of said slices being defined by an ordinal number, overall contour information for describing shape of said slice in an X-Y dimensional plane, slice thickness information for describing thickness of said slice in a Z dimension, and slice image information;
   (B) extracting a plurality of layers from stock material, each of said plurality of layers corresponding to a respective one of said plurality of slices;
   (C) applying corresponding slice image information to said plurality of layers; and (D) stacking said plurality of layers based on said ordinal numbers of said plurality of slices to form said informational prototype.

38. The method recited in claim 1 wherein said slice information comprises thermal gradients, stress contours, internal elements, or time dependent changes.

39. The method recited in claim 9 wherein said slice information comprises thermal gradients, stress contours, internal elements, or time dependent changes.

40. The information medium recited in claim 17 wherein said slice information comprises thermal gradients, stress contours, internal elements, or time dependent changes.

41. The information medium recited in claim 22 wherein said slice information comprises thermal gradients, stress contours, internal elements, or time dependent changes.

42. The informational prototype recited in claim 24 wherein said slice information comprises thermal gradients, stress contours, internal elements, or time dependent changes.

43. The informational prototype recited in claim 31 wherein said slice information comprises thermal gradients, stress contours, internal elements, or time dependent changes.

\* \* \* \* \*

UNITED STATES PATENT AND TRADEMARK OFFICE
CERTIFICATE OF CORRECTION

PATENT NO.    : 6,654,656 B2
DATED         : November 25, 2003
INVENTOR(S)   : Thenkurussi Kesavadas and Kirk C. Stalis It is certified that error appears in the above-identified patent and that said Letters Patent is hereby corrected as shown below:

Column 12,
Line 57, add a comma following the word "system"

Signed and Sealed this

Twenty-fourth Day of February, 2004

JON W. DUDAS
*Acting Director of the United States Patent and Trademark Office*